United States Patent
Wang et al.

(10) Patent No.: US 12,132,802 B2
(45) Date of Patent: Oct. 29, 2024

(54) OFF-CHIP MEMORY BACKED RELIABLE TRANSPORT CONNECTION CACHE HARDWARE ARCHITECTURE

(71) Applicant: Google LLC, Mountain View, CA (US)

(72) Inventors: Weihuang Wang, Los Gatos, CA (US); Srinivas Vaduvatha, San Jose, CA (US); Xiaoming Wang, Sunnyvale, CA (US); Gurushankar Rajamani, Sunnyvale, CA (US); Abhishek Agarwal, San Jose, CA (US); Jiazhen Zheng, Santa Clara, CA (US); Prashant Chandra, San Jose, CA (US)

(73) Assignee: Google LLC, Mountain View, CA (US)

( * ) Notice: Subject to any disclaimer, the term of this patent is extended or adjusted under 35 U.S.C. 154(b) by 108 days.

(21) Appl. No.: 17/553,387

(22) Filed: Dec. 16, 2021

(65) Prior Publication Data

US 2023/0062889 A1    Mar. 2, 2023

Related U.S. Application Data

(60) Provisional application No. 63/239,603, filed on Sep. 1, 2021.

(51) Int. Cl.
*H04L 67/568* (2022.01)
*G06F 16/2455* (2019.01)
*H04L 49/00* (2022.01)
*H04L 69/326* (2022.01)

(52) U.S. Cl.
CPC ...... *H04L 67/568* (2022.05); *G06F 16/24552* (2019.01); *H04L 49/3063* (2013.01); *H04L 69/326* (2013.01)

(58) Field of Classification Search
CPC . H04L 67/568; H04L 49/3063; H04L 69/326; H04L 49/109; G06F 16/24552; G06F 16/24452
See application file for complete search history.

(56) References Cited

U.S. PATENT DOCUMENTS

| | | |
|---|---|---|
| 7,219,188 B1 | 5/2007 | Pereira |
| 7,305,486 B2 | 12/2007 | Ghose et al. |
| 7,571,278 B2 | 8/2009 | Anthony, Jr. et al. |
| 7,817,634 B2 | 10/2010 | Coffman et al. |
| 7,870,217 B2 | 1/2011 | Pandya |
| 8,549,170 B2 | 10/2013 | Minami et al. |

(Continued)

OTHER PUBLICATIONS

Montazeri, Behnam et al. "Homa: A Receiver-Driven Low-Latency Transport Protocol Using Network Priorities." SIGCOMM '18, Aug. 20-25, 2018, Budapest, Hungary. pp. 221-235.

(Continued)

*Primary Examiner* — Nam T Tran
(74) *Attorney, Agent, or Firm* — Lerner David LLP

(57) ABSTRACT

An application specific integrated circuit (ASIC) is provided for reliable transport of packets. The network interface card may include a reliable transport accelerator (RTA). The RTA may include a cache lookup database. The RTA may be configured to determine, from a received data packet, a connection identifier and query the cache lookup database for a cache entry corresponding to a connection context having the connection identifier. In response to the query, the RTA may receive a cache hit or a cache miss.

20 Claims, 9 Drawing Sheets

(56) References Cited

U.S. PATENT DOCUMENTS

| | | |
|---|---|---|
| 8,610,086 B2 | 12/2013 | Wolleschensky et al. |
| 2004/0030770 A1 | 2/2004 | Pandya |
| 2004/0049612 A1 | 3/2004 | Boyd et al. |
| 2004/0156393 A1* | 8/2004 | Gupta .................... H04L 69/12 370/469 |
| 2004/0165588 A1 | 8/2004 | Pandya |
| 2005/0226238 A1* | 10/2005 | Hoskote ................ H04L 69/326 370/389 |
| 2006/0274787 A1* | 12/2006 | Pong .................... H04L 67/1097 370/469 |
| 2008/0313364 A1 | 12/2008 | Flynn et al. |
| 2014/0201318 A1 | 7/2014 | Dajani et al. |
| 2014/0269294 A1* | 9/2014 | Morandin ............... H04L 69/16 370/234 |
| 2017/0068640 A1* | 3/2017 | Shahar ................ H04L 67/1097 |
| 2017/0187598 A1 | 6/2017 | Andreyev et al. |
| 2018/0102975 A1 | 4/2018 | Rankin |
| 2018/0351692 A1 | 12/2018 | Rozenboim |
| 2019/0190542 A1 | 6/2019 | Wang et al. |
| 2020/0314030 A1 | 10/2020 | Goel et al. |
| 2021/0089450 A1 | 3/2021 | Simionescu et al. |
| 2021/0119730 A1* | 4/2021 | Das Sharma ......... H04L 1/0017 |
| 2021/0373944 A1* | 12/2021 | Lee ....................... G06F 9/4881 |
| 2022/0400123 A1* | 12/2022 | Ayoub ................ H04L 67/1097 |
| 2023/0061794 A1* | 3/2023 | Livne .................... H04L 47/28 |

OTHER PUBLICATIONS

Rajiullah, Mohammad. "Towards a Low Latency Internet: Understanding and Solutions." Sep. 2015. Dissertation. Department of Computer Science, Karlstad University, Sweden. 58 pages.

Vernersson, Andreas. "Analysis of UDP-based Reliable Transport using Network Emulation." 2015. Master's Thesis. Master of Science in Engineering Technology Computer Science and Engineering. Luleå University of Technology. 93 pages.

Wu, Haitao et al. "ICTCP: Incast Congestion Control for TCP in Data-Center Networks." IEEE/ACM Transactions on Networking, vol. 21, No. 2, Apr. 2013. pp. 345-358.

Extended European Search Report for European Patent Application No. 21155513.1 dated Jul. 30, 2021. 9 pages.

Extended European Search Report for European Patent Application No. 22157939.4 dated Aug. 1, 2022. 10 pages.

Office Action for European Patent Application No. 21155513.1 dated Jan. 24, 2024. 7 pages.

Wu et al., "A Practical Packet Reordering Mechanism with Flow Granularity for Parallelism Exploiting in Network Processors," Proceedings of the 19th IEEE International Parallel and Distributed Processing Symposium (IPDPS'05), Apr. 4, 2005. 8 pages.

* cited by examiner

OFF-CHIP MEMORY BACKED RELIABLE TRANSPORT CONNECTION CACHE HARDWARE ARCHITECTURE

CROSS-REFERENCE TO RELATED APPLICATIONS

The present application claims the benefit of the filing date of U.S. Provisional Patent Application No. 63/239,603 filed Sep. 1, 2021, the disclosure of which is hereby incorporated herein by reference.

BACKGROUND

The Internet protocol suite is a set of communication protocols used for servicing data transmissions between two devices communicating information over the Internet or other computer networks. Transmission Control Protocol ("TCP") is a part of the Internet protocol suite that provides for connection-oriented, reliable, and ordered delivery of a stream of data packets between, for example, a web-browser application running on a client device and a web-server application running on a server device over a local or wide area network. Datacenters using communication protocols such as TCP encounter certain issues. For instance, incast is a many-to-one communication pattern commonly found in datacenters, which may result in incast congestion when multiple synchronized computing devices send data to a same receiver computing device in parallel. Further, because TCP protocols require ordered delivery of packets over a connection, a long tail latency, which is the amount of time for the last few packets among a series of packets to be transmitted, may prevent transmission of the next series of packets.

To address these issues, alternative reliable transport protocols have been developed as communication protocols. Reliable transport protocols rely on tracking data according to an identifier and maintaining more active connections in a cache for faster processing. Less active, or inactive connections, may be stored off cache. However, given that there may be millions of connections, processing data and managing the connections may require significant processing power.

BRIEF SUMMARY

The present disclosure provides a network interface card configured to track active and stored connection contexts within on-chip and off-chip memory. One aspect of the technology is directed to an application specific integrated circuit (ASIC), including a reliable transport accelerator (RTA), the RTA including a cache lookup database. The RTA may be configured to: determine, from a received data packet, a connection identifier; query the cache lookup database for a cache entry corresponding to a connection context having the connection identifier; and receive, in response to the query, a cache hit or a cache miss.

In some instances, the ASIC further includes on-chip memory storing one or more connection contexts associated with one or more connection identifiers.

In some instances, the ASIC is attached to a network interface card.

In some examples, the network interface card includes off-chip memory storing one or more connection contexts associated with one or more connection identifiers, wherein the off-chip memory is connected to the ASIC.

In some examples, a cache miss indicates that the connection context having the connection identifier is not stored in the cache lookup database.

In some instances, after receiving a cache miss, the RTA retrieves the connection context from the on-chip memory or the off-chip memory.

In some examples, the RTA stores the connection context in the on-chip memory or the off-chip memory based on a predefined user configuration.

In some instances, a cache hit indicates that the connection context having the connection identifier is stored in the cache lookup database.

In some examples, a cache policy is stored by the cache lookup database, wherein the cache policy defines when one or more connection contexts are evicted from the cache lookup database.

In some instances, evicted connection contexts are moved to on-chip or off-chip memory.

In some examples, the system includes an upper-layer protocol accelerator (ULP) and a packet process pipeline accelerator.

Another aspect of the disclosure is directed to a method for managing connection contexts. The method may include determining, by a reliable transport accelerator (RTA) including a cache lookup database, a connection identifier for a received data packet; querying, by the RTA, the cache lookup database for a cache entry corresponding to a connection context having the connection identifier; and receiving, from the cache lookup database, in response to the query, a cache hit or a cache miss.

In some instances, a cache miss indicates that the connection context having the connection identifier is not stored in the cache lookup database.

In some examples, after receiving a cache miss, the RTA retrieves the connection context from on-chip memory or off-chip memory.

In some examples, the RTA stores the connection context in the on-chip memory or the off-chip memory based on a predefined user configuration.

In some instances, a cache hit indicates that the connection context having the connection identifier is stored in the cache lookup database.

In some instances, the RTA further includes a cache policy stored by the cache lookup database, wherein the cache policy defines when one or more connection contexts are evicted from the cache lookup database.

In some examples, evicted connection contexts are moved to on-chip or off-chip memory.

In some instances, the on-chip memory is located on an ASIC with the RTA.

In some examples, the off-chip memory is located off the ASIC.

DETAILED DESCRIPTION

The technology generally relates to a network interface card configured to track active and stored connection contexts within on-chip and off-chip memory. The particular Reliable Transport protocol, described herein, referred to as "RT," employs a connection-oriented architecture that provides reliable packet delivery over a lossy and out-of-order network. Every reliable transport packet may be associated with a connection. The states of each connection may be tracked in a connection context, which includes sliding windows for packet reliability, transaction ordering information, security protection and congestion control, etc. The network interface card described herein may support thousands of active connections within an on-chip cache and a million, or more, connections stored in off-chip memory.

As used herein the term "connection context" refers to the state of a connection, which may include sliding windows for packet reliability, transaction ordering information, security protection, and congestion control. Other information about a connection may also be included in a connection context.

Figure 1:
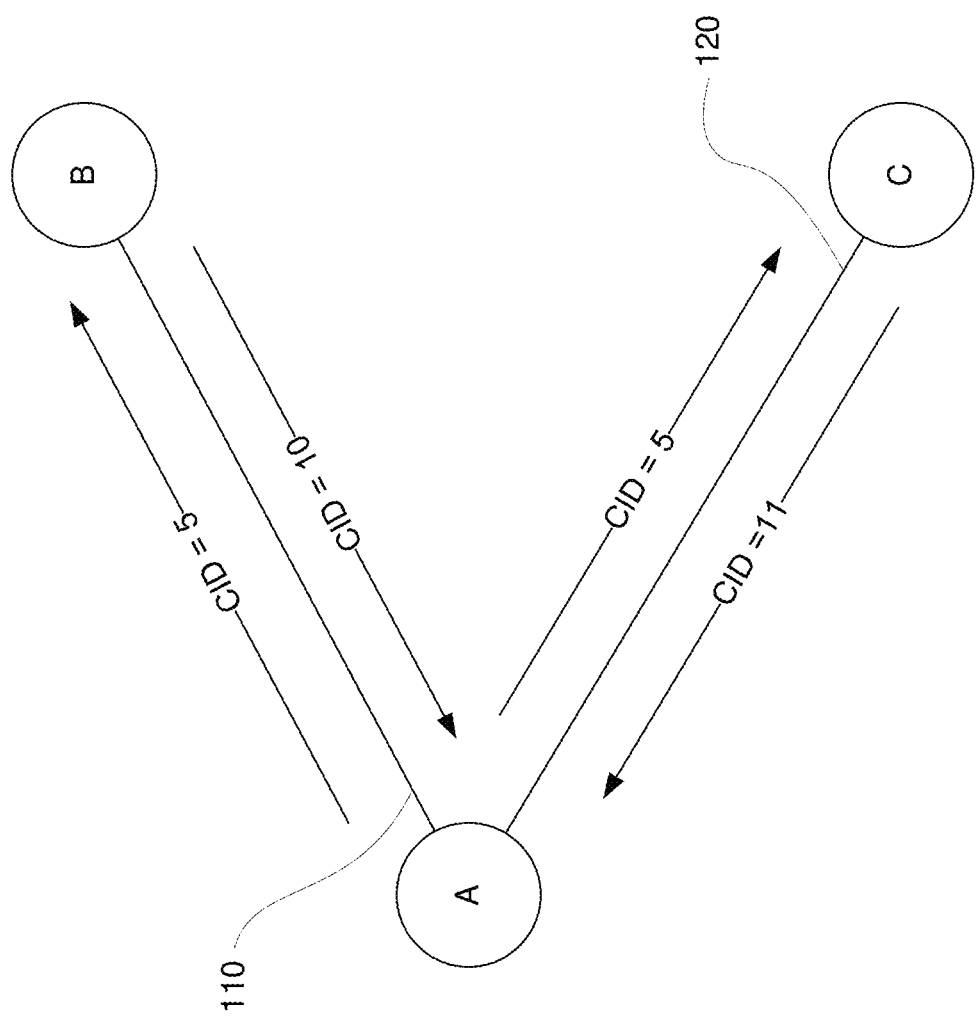
FIG. 1 is a schematic diagram of a network according to aspects of the technology.

FIG. 1 shows an example network 100. The network 100 includes various entities, such as entity A, entity B, and entity C. In order to communicate with one another, connections are formed between the entities, such as connection 110 between entities A and B, and connection 120 between entities A and C. The entities may communicate over the connections using one or more protocols. For example, RT is a protocol that notifies the sender whether or not the delivery of data to an intended receiver was successful. A sender and a receiver are considered peers of a communication protocol, thus entities A and B may be reliable transport peers, and entities A and C may be reliable transport peers. A connection over which RT is used is an end-to-end construct that describes a bidirectional communication channel between two reliable transport peers.

A connection may be identified by a pair of Connection IDs ("CIDs"), one in each direction of communication. CIDs may be allocated by a receiver entity during the connection setup process and have no global significance outside of the parties involved. Thus, the connection 110 between entities A and B may have a CID with value 5 for the direction from A to B, and a CID with value 10 for the direction from B to A. The connection 120 between entities A and C may have a CID value 5 for the direction from A to C and a CID with value 11 for the direction from C to A. Further, CIDs assigned by an entity or "Source CIDs" of an entity must have different values. Thus in the example shown, the CIDs assigned by entity A or Source CIDs of entity A have different values 10 and 11. In contrast, "Destination CIDs" of an entity are assigned by other entities and may have the same value. Thus, in the example shown, the Destination CIDs of entity A are assigned by entities B and C respectively, which may have the same value 5.

Packets may be transmitted over the connections between the entities. In this regard, a packet is a basic unit of communication across a connection. A packet may have a predetermined size, for example up to a maximum transfer unit ("MTU") in length. A packet may have a header including information about the packet and its transmission, and a payload of data. To ensure reliable transport, a reliable transport packet may include the Destination CID, such as in a header. For example, when entity B receives a packet over the connection 110 with the Destination CID of 5, entity B may identify the packet as coming from entity A, and may then notify A that the packet has been received by sending an acknowledgment over the connection 110 referencing this packet and its CID of 5. The acknowledgment itself may be sent as a packet including the Destination CID of 10.

Figure 2:
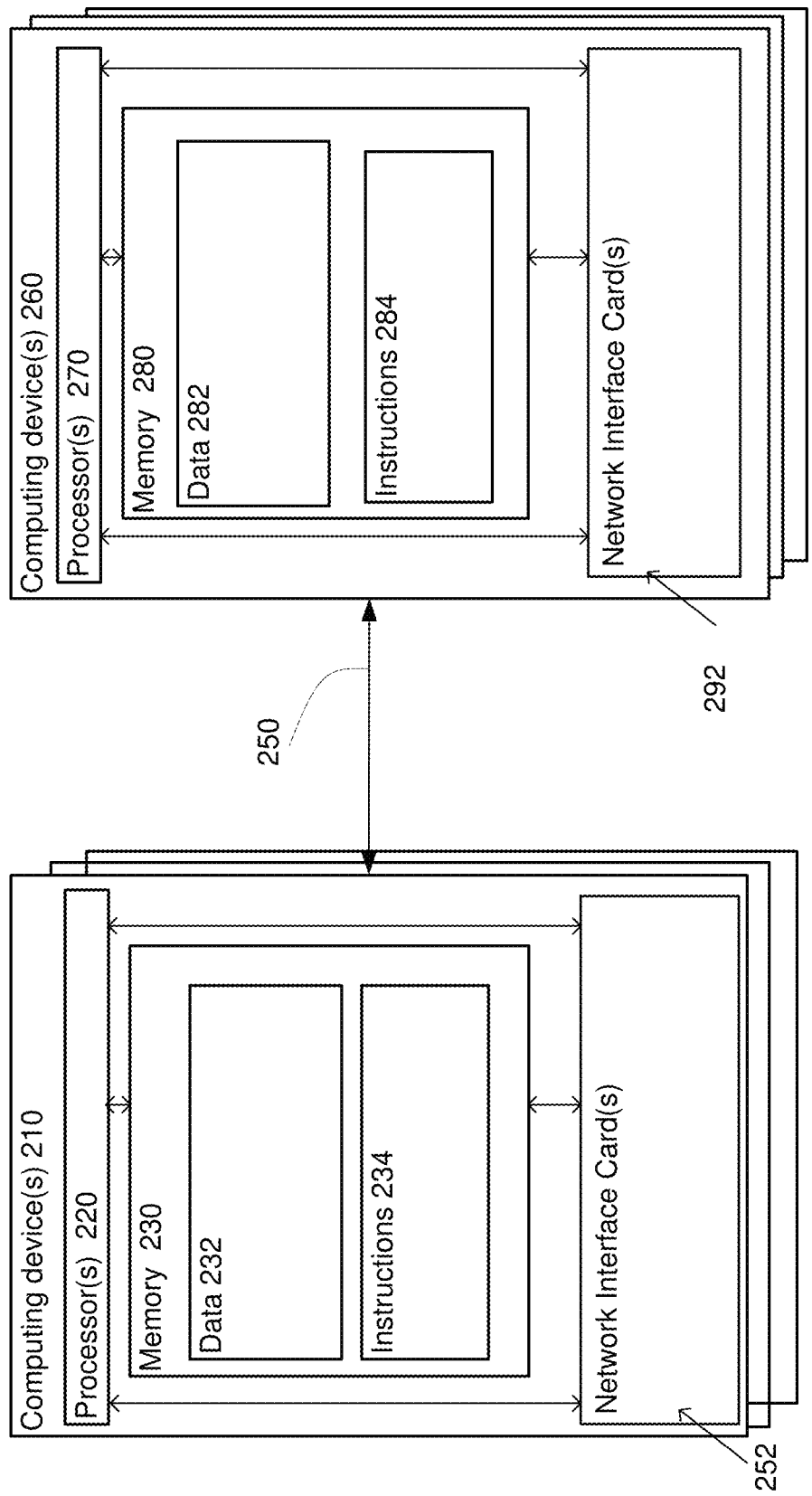
FIG. 2 is a block diagram of an example system according to aspects of the technology.

Entities A, B, and C may be any type of device capable of communicating over a network, such as personal computing devices, server computing devices, mobile devices, wearable devices, virtual machines, etc. FIG. 2 is a block diagram of some components in an example system 200 that can communicate using RT protocol. The system 200 includes at least two entities having one or more connections between them. It should not be considered as limiting the scope of the disclosure or usefulness of the features described herein. In this example, the system 200 is shown with two entities, one or more computing devices 210 and one or more computing devices 260, with a connection 250 between them. For example, computing devices 210 may be entity A and computing devices may be entity B of FIG. 1, and connection 250 may be connection 110 of FIG. 1. The computing devices 210 and 260 may be configured with similar components as shown or may include additional and/or different components. In the example shown, the computing devices 210 contain one or more processors 220, memory 230, and one or more network interface cards 252. The one or more processors 270, memory 280, and the one or more network interface cards 292 of computing device 260 may be configured similarly to one or more processors 220, memory 230, and one or more network interface cards 252 of computing devices 210.

The one or more processors 220 can be any conventional processor, such as a commercially available CPU. Alternatively, the processors can be dedicated components such as an application-specific integrated circuit ("ASIC") or other hardware-based processor. Although not necessary, one or more of the computing devices 210 may include specialized hardware components to perform specific computing processes.

The memory 230 can be of any non-transitory type capable of storing information accessible by the processor, such as a hard-drive, memory card, ROM, RAM, DRAM, DVD, CD-ROM, write-capable, and read-only memories. Memory 230 of the computing devices 210 can store information accessible by the one or more processors 220, including data 232 and instructions 234.

Memory 230 can include data 232 that can be retrieved, manipulated or stored by the processors 220. For example, data such as communication protocols, connection information such as CIDs, definitions of headers, etc., as described herein with respect to FIG. 1 and FIGS. 3-9 may be retrieved, manipulated, or stored by the processors 220.

Memory 230 of the computing devices 210 can also store instructions 234 that can be executed by the one or more processors 220. For instance, instructions such as communication protocols as described with reference to FIGS. 1 and 3-9 may be performed by the one or more processors 220 according to instructions 234 and data 232 in memory 230.

Data 232 may be retrieved, stored, or modified by the one or more processors 220 in accordance with the instructions 234. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII, or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The instructions 234 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance.

Although not shown, computing devices 210 may further include other components typically present in general purpose computing devices. For example, computing devices 210 may include output devices, such as displays (e.g., a monitor having a screen, a touch-screen, a projector, a television, or another device that is operable to display information), speakers, haptics, etc. The computing devices 210 may also include user input devices, such as a mouse, keyboard, touch-screen, microphones, sensors, etc.

Although FIG. 2 functionally illustrates the processor, memory, and other elements of computing devices 210 as being within the same block, the processor, computer computing device, or memory can actually comprise multiple processors, computers, computing devices, or memories that may or may not be stored within the same physical housing. For example, the memory can be a hard drive or other storage media located in housings different from that of the computing devices 210. Accordingly, references to a processor, computer, computing device, or memory will be understood to include references to a collection of processors, computers, computing devices, or memories that may or may not operate in parallel. For example, the computing devices 210 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The computing devices 210 may be capable of directly and indirectly communicating with other entities, such as computing devices 260, of a network through connection 250.

Computing devices 210 and 260 may be interconnected using various protocols and systems, such that computing devices in the network can be part of the Internet, World Wide Web, specific intranets, wide area networks, or local networks. Computing devices in the network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Figure 3:
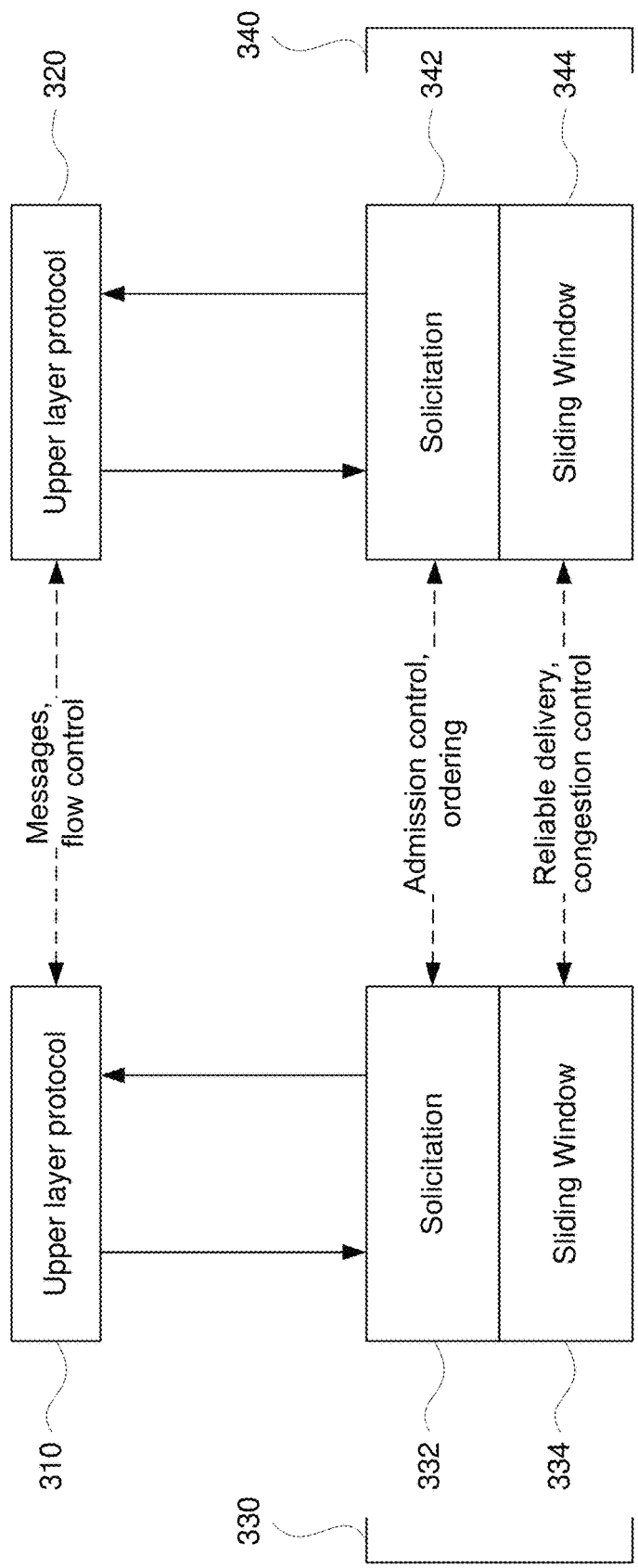
FIG. 3 is a block diagram of communication layers according to aspects of the technology.

Referring to FIG. 1, packets may be transmitted between the entities A, B, and/or C over the connections using one or more communication protocols. FIG. 3 shows an example communication protocol system 300. The communication protocol system 300 may be implemented on two or more entities in a network, such as two or more of entities A, B, C of network 100 of FIG. 1, for example by network interface cards 252 and 292 of FIG. 2, as further described below with reference to at least FIG. 7. As shown, each entity may include multiple layers of communication protocols. For example, entity A may include upper-layer protocol ("ULP") 310 and reliable transport (RT) protocol 330, and entity B may include upper-layer protocol 320 and reliable transport (RT) protocol layer 340. Peers may be formed between protocols of each layer. Thus, ULP 310 and ULP 320 are ULP peers, and reliable transport protocol layer 330 and reliable transport protocol layer 340 are RT peers. Further as shown, within each entity, the upper-layer protocols are configured to communicate with the RT protocols.

As described with reference to FIGS. 4-12, the upper-layer protocols 310, 320 may be responsible for implementing the hardware/software interface, processing of messages, completion notifications, and/or end-to-end flow control. The upper-layer protocols may be implemented on any of a number of hardware or software devices. For example, the upper-layer protocols may be implemented as Remote Direct Memory Access ("RDMA") operation. As another example, the upper-layer protocols may be implemented as a Non-Volatile Memory Express ("NVMe").

Also described with reference to FIGS. 4-9, the RT protocols 330, 340 may be responsible for reliable delivery of packets, congestion control, admission control, and/or ordered or unordered delivery of packets. Each RT protocol 330, 340 may logically be partitioned into two sublayers of protocols. Thus as shown, reliable transport protocol layer 330 is partitioned into a solicitation sublayer 332 that is responsible for end-point admission control and optionally ordered delivery of packets, and a sliding window sublayer 334 that is responsible for end-to-end reliable delivery and congestion control. Likewise, the reliable transport protocol layer 340 is also divided into a solicitation sublayer 342 and a sliding window sublayer 344.

Figure 4:
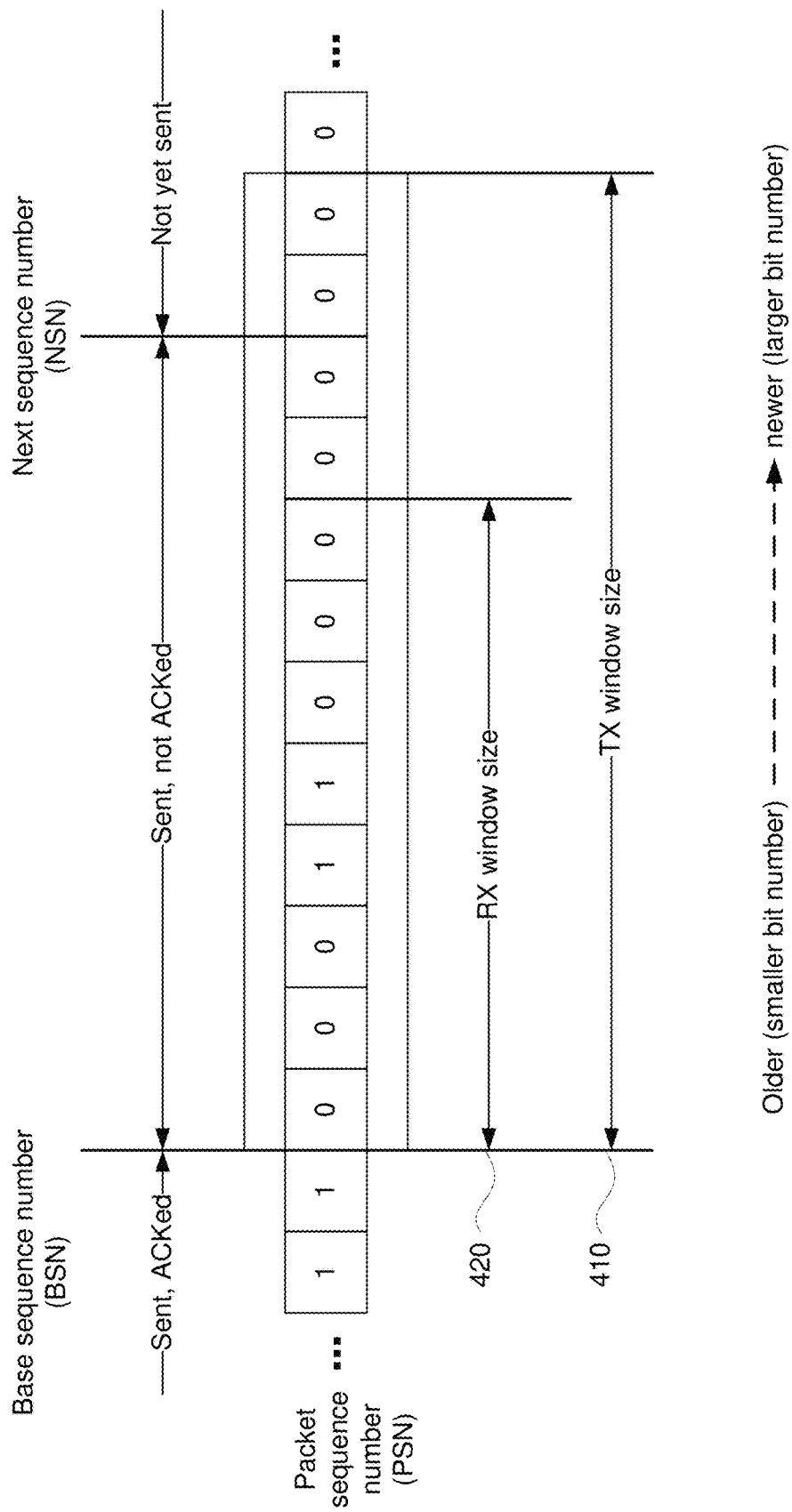
FIG. 4 illustrates an example sliding window according to aspects of the technology.

FIG. 4 shows example sliding windows 410 and 420. The sliding windows 410 and 420 are used by entities to keep track of a predetermined number of packets to be transmitted and acknowledged over a connection. For example, entity A may use the TX sliding window 410 for keeping track of packets sent to entity B over the connection 110. Entity B may use the RX sliding window 420 for keeping track of packets received from entity B. In some examples, delays may occur between the TX sliding window 410 and RX sliding window 420 due to network latency. As a result, the TX sliding window 410 and RX sliding 420 window may go out-of-sync temporarily as the network out-of-order and/or loss. As such, the sliding windows 410 and 420 may be respectively implemented in the sliding window sublayer 334 that is part of the reliable transport protocol layer 330 of FIG. 3. The TX sliding window and the RX sliding window may have different sizes as shown, or may alternatively have the same size.

Referring to the TX sliding window 410, to keep track of the packets, each packet is assigned a Packet Sequence Number ("PSN") by the sender entity A. As shown, the bit number increases from left to right. The receiver entity B may acknowledge the packets it has received within the sliding window by communicating to the sender entity A the PSN it has received within the window in an acknowledgment packet. In this regard, a Sequence Number Bitmap (SNB) may be provided on both the sender entity A and the receiver entity B. Each bit of the Sequence Number Bitmap (SNB) represents one packet within a sliding window at the entity. For example, for the TX sliding window 410, a bit is set to 1 if a sent packet has been acknowledged. Otherwise the bit is 0. Once all packets within the TX sliding window 410 are received and acknowledged, the sender entity A may move the sliding window 410 forward to the next set of packets to be transmitted. The sliding window moves forward once the base sequence number (BSN) packet is acknowledged. Thus, referring to the example in FIG. 4, the sliding window moves by one once the left most 0 is marked, and moves by another one once the second-left-most 0 is marked, and by three once the third 0 is marked (since the two following bits are already set).

PSN for the sender entity may include Base Sequence Number ("BSN") and Next Sequence Number ("NSN"). As shown, BSN is the PSN value of the oldest packet that is yet to be acknowledged by the receiver entity B. Further as shown, NSN is the PSN value that should be assigned to the next packet transmitted over the connection to receiver entity B. For instance, when a packet is received from ULP 310 for transmission, the current PSN may be updated to NSN. Then when the packet is transmitted over the connection, NSN may be incremented, for example with NSN= (NSN+1) mod $2^{32}$. As such, within the sliding window 410, Bit 0 represents a PSN value of BSN, and Bit n represents a PSN value of (BSN+n).

Although not shown, the receiver entity may also keep one or more sliding windows. For example, an RX sliding window may be kept by receiver entity B for the packets received, where each bit represents a packet to be received with the sliding window. The bit is set to 1 if the packet has been received by the receiver entity B. Otherwise the bit is 0. The receiver entity B may also use PSN to keep track of received packets. For instance, BSN may be the PSN value of the oldest packet that is yet to be received by the receiver entity. When a packet is received with a PSN value of BSN, the BSN may be updated to the next lowest PSN of the packet that has not yet been received, for example with BSN=(BSN+1) mod $2^{32}$. The update of the BSN may clear the bits in the Sequence Number Bitmap corresponding to packets from the previous BSN to the PSN. As such, within the RX sliding window for the receiver entity B, Bit 0 represents a PSN value of BSN and Bit n represents a PSN value of (BSN+n). Because sender entity A does not acknowledge the acknowledgments sent by receiver entity B, that is, PSN is not used for the acknowledgment packets, the receiver entity B need not keep a TX sliding window for the acknowledgments it sends.

The sender entity and receiver entity may handle the packets and the respective acknowledgments according to a set of rules. For instance, if the receiver BSN in a received packet is smaller than the sender entity's BSN, the sender entity discards the ACK information; otherwise, the sender entity updates its BSN to match the receiver entity's BSN. After adjusting its BSN, the sender entity applies an OR operation on the receiver entity's Sequence Number Bitmap in the ACK packet with its own Sequence Number Bitmap. After a packet is transmitted, it is buffered by the sender entity until it is acknowledged by the receiver entity. Further, upon per packet retransmit timer expiry, the sender entity retransmits the packet with the same PSN as the original packet and increment a retransmission counter for that packet.

The receiver entity may also implement a number of rules. For instance, if the PSN value of the received packet is less than the BSN of the received packet, the receiver entity discards the packet and sends an ACK packet with the current BSN. If the PSN value falls within the receiver entity's sliding window, the receiver entity updates the Sequence Number Bitmap by setting the bit at location (PSN-BSN) to 1. If the bit at location (PSN-BSN) was already 1, the packet is discarded; otherwise, the packet is delivered to the ULP of the receiver entity, and a cumulative ACK counter is incremented. If the PSN of the received packet is equal to the BSN of the received packet, the receiver entity updates the BSN to be equal to the next highest PSN that has not been received.

Note that, because the packets are tracked according to bitmaps, the sliding windows are configured to allow the entities to keep track of packets received and/or acknowledged out-of-order within the respective sliding window. Thus as shown, although packets represented by bits 3 and 4 may be sent by entity A before the packets represented by bits 0, 1, and 2, the packets represented by bits 3 and 4 may be received and/or acknowledged before the packets represented by bits 0, 1, 2 in the TX sliding window 410.

Network congestion may be detected by monitoring packet retransmission and/or packet round-trip latencies. To perform congestion control, the size of the one or more sliding windows may be adjusted. For example, if congestion is high, it may take longer for all packets within the TX sliding window 410 to be received and/or acknowledged by entity B. As such, to reduce congestion, the number of outstanding packets in the network may be reduced by decreasing the size of the sliding window 410. In addition to or as an alternative to changing the size of the sliding window, the retransmission timer expiry value in response to network congestion status may be adjusted. For example, retransmitting less frequently might reduce network congestion.

Figure 5:
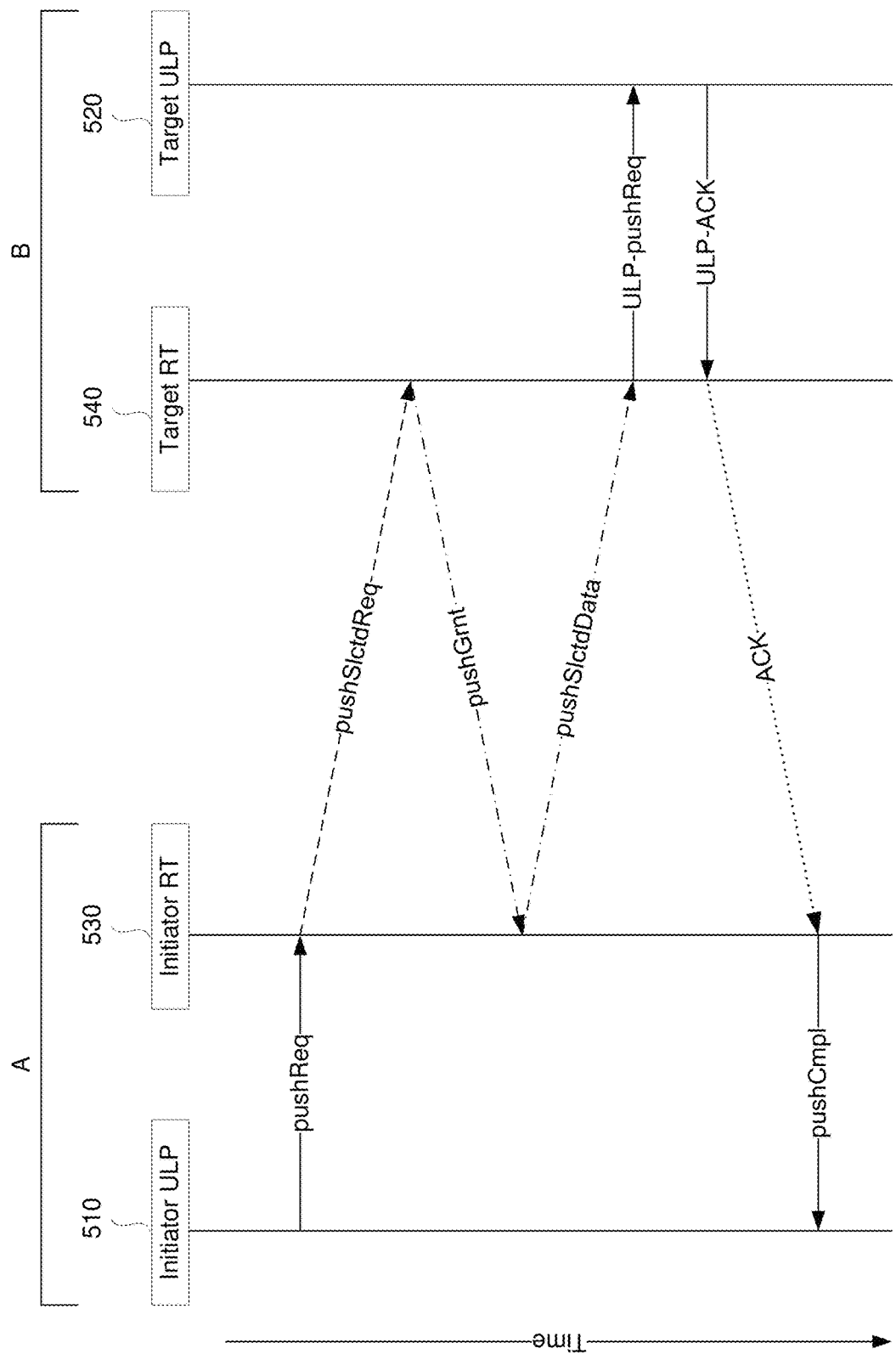
FIG. 5 is an example timing diagram of solicited push transaction according to aspects of the technology.

The communication protocol system 300 of FIG. 3 may support various transactions, including both pull and push transactions. The communication protocol system 300 of FIG. 3 may be configured to perform the transactions using an initiator-target approach, where an "initiator" is the entity that requests a transaction, and a "target" is the entity that responds to the request. Such a transaction may involve multiple packets to be transmitted between the initiator and target entities, thus the initiator and the target entities may be both sender and receiver of packets in the transaction, and may keep track of packets and/or acknowledgments using TX and/or RX sliding windows as described with reference to FIG. 4. FIG. 5 shows an example timing diagram for a push transaction according to aspects of the technology. It is noted that pull transaction may be similarly constructed without the push grant (PushGrnt) feedback. The push transaction depicted in FIG. 5 is a solicitated push request. Other types of push transactions, such as unsolicited push requests, may be similarly constructed without the push grant (PushGrnt) feedback as needed. The example timing diagrams of FIG. 5 may be implemented by two entities in a network, such as entities A and B over connection 110 of FIG. 1, for example by processors 220 and 270 of FIG. 2.

FIG. 5 shows a timing diagram 500 for a push request, such as a solicited push transaction. As shown, the push transaction is performed by various communication protocol layers of both the initiator entity and the target entity. For example, entity A may be the initiator entity and initiator ULP 510 and initiator RT 530 may be communication protocol layers configured as upper-layer protocol 310 and reliable transport protocol layer 330 of FIG. 3, while entity B may be the target entity and target ULP 520 and target RT 540 may be communication protocol layers configured as upper-layer 320 and reliable transport protocol layer 340 of FIG. 3.

As depicted in FIG. 5, a push request ("pushReq") may originate from the initiator entity A at the initiator ULP 510, which may be sent to the initiator RT 530. At this stage, the initiator RT 530 only sends a request to the target entity B, for instance over the connection 110, which may or may not be granted by the target entity B. This request and grant process or "solicitation" process may be performed by the respective RTs, which for example may be performed by their respective solicitation sublayers. Thus, the initiator RT 530 is shown sending a push request ("pushSlctdReq") to the target RT 540, and the target RT 540 may decide whether and/or when to grant the pushSlctdReq. In some examples, entity B may limit the total number of outstanding granted pushSlctdData to prevent incast to entity B that causes congestion in the network. If and when the target RT 540 grants the request, the target RT 540 may send a push grant ("pushGrnt") back to the initiator RT 530. Once the initiator RT 530 receives the pushGrnt, the initiator entity A may then push solicited data ("pushSlctdData") onto the target entity B, for instance over the connection 110. This may be performed by the respective RTs, thus the initiator RT 530 is shown pushing solicited data ("pushslctdData") to the target RT 540. The data here is effectively solicited by the pushGrnt from the target RT 540. Once the data is received by the target entity B, the target RT 540 may request for the received data to be placed or stored at the target entity B and does so by sending a pushReq to the target ULP 520. In response, the target ULP 520 may place or store the received data, and then sends an acknowledgment message ("ULP-ACK") to the target RT 540 acknowledging that the received data has been placed or stored according to the pushReq. For reliable transport, the target entity B sends an acknowledgment message ("ACK") to notify initiator entity A of the receipt and placement of the pushed data, for instance over the connection 110. This is performed by the respective RTs, thus as shown the target RT 540 sends the ACK message to the initiator RT 530. Once the ACK message is received by the initiator RT 530, the initiator RT 530 may send a push complete message ("pushCmpl") to initiator ULP 510 to notify that the data packet has been received and placed by the target entity.

As described with reference to FIG. 1, the initiator entity A and the target entity B may communicate with each other by transmitting packets. Thus, the pushSlctdReq, pushGrnt, pushslctdData and ACK may each be a packet transmitted over the connection 110. Further as described with reference to FIG. 4, reliable transport packets may be tracked by sliding windows. As such, the pushslctdData packet may be part of a data TX sliding window kept by entity A (indicated by dash-dot line). The pushGrnt packet may be part of a data TX sliding window kept by entity B (indicated by dash dot line), and the pushSlctdData packet may be part of a data TX sliding window kept by entity A (indicated by dash-dot line). For reliable transport, the ACK packet sent by entity B may reference the PSN of the pushSlctdData, which entity A may keep track of using the data TX sliding window. Likewise, though not shown, entity A may send ACK for the pushGrnt packet, which entity B may keep track of using its data TX sliding window, and entity B may send ACK for the pushSlctdReq, which entity A may keep track of using its request TX sliding window. However, acknowledgment messages such as the ACK packet shown (indicated by dot line) are not reliable transport packets, and thus may not be part of any sliding window at the sender entity B.

As illustrated by FIG. 5, the solicited push transaction allows an initiator entity to solicit a grant to send data from a target entity before actually sending the data. As such, the target entity may have control over the incoming data, which may be especially helpful when multiple initiator entities are attempting to push data onto the target entity, and also if the pushed data is large or if the network is congested. Since incast congestion may be caused by packets not being delivered to the receiver as fast as transmitted, and/or by multiple entities attempting to send packets simultaneously to the same entity, such a solicitation process may reduce incast congestion.

Figure 6:
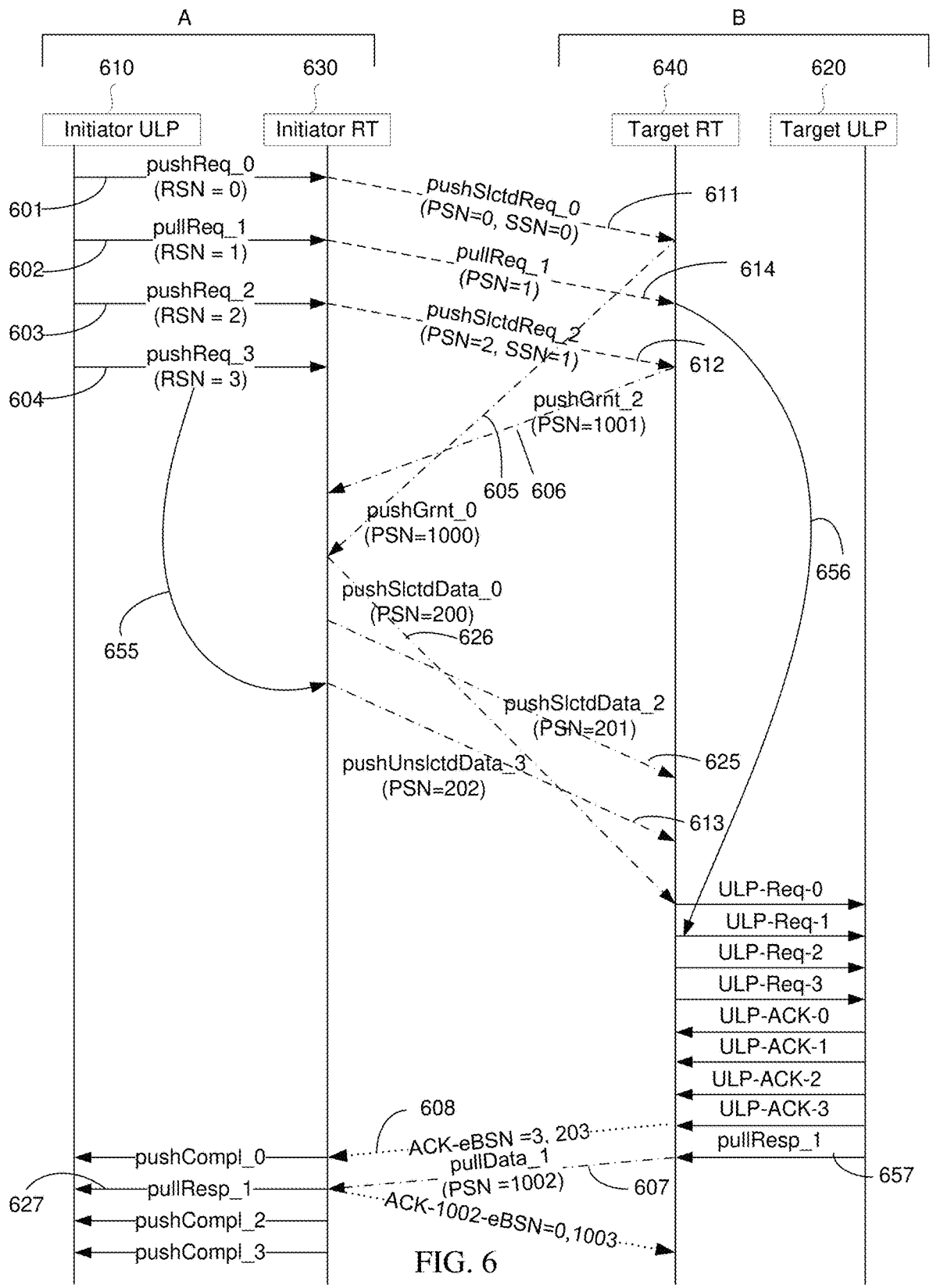
FIG. 6 is an example timing diagram of transactions according to aspects of the technology.

It is noted that other types of the requests, such as an unsolicited push request and/or pull request may also be utilized in the communication protocol system, as shown in FIG. 6, with different feedback mechanisms. For example, an unsolicited push request does not require a pushGrnt from the target entity to send the push unsolicited data. Similarly, a pull request does not need a pull grant from target RT. Instead, the target RT may then send the pull request to the target ULP to request permission. The target ULP may then send an acknowledgment message ("ULP-ACK") to the target RT acknowledging the pull request, as well as a pull response ("pullResp") instructing the target RT to pull the requested data. In response to the pull request, the target RT may pull the requested data ("pullData"), and send the pulled data to the initiator RT, for instance over the connection 110. Once the requested data is received by the initiator RT, the initiator RT may send a pullResp to the initiator ULP so that the initiator ULP may place or store the received data packet.

Thus, the communication protocol system may be configured to perform both of the solicited push transactions and/or the unsolicited push transactions. Where the communication protocol system is configured to perform both of the push transactions, the system may be configured to determine which push transaction to use based on one or more factors. For instance, whether a push request should be sent as a solicited or unsolicited request may be determined by the initiator RT. The initiator RT may determine whether to send a solicited push request or an unsolicited push based on a length of the push request from the initiator ULP. As an example, if a push request requires a large amount of data to be pushed, such as meeting a predetermined size threshold, a solicited push request may be used to make sure that the large request does not cause congestion; otherwise, an unsolicited push may be used. As another example, whether to use solicited request or unsolicited push may be based on network conditions, such as level of congestion, where a solicited request may be used when congestion meets a predetermined threshold level.

FIG. 6 shows an example timing diagram for ordered transactions over a connection according to aspects of the technology. The example timing diagrams of FIG. 6 may be implemented by two entities in a network, such as entities A and B over connection 110 of FIG. 1, for example by processors 220 and 270 of FIG. 2.

As depicted in FIG. 6, various transactions, such as the pull and push transactions, may be performed by various communication protocol layers of both the initiator entity and the target entity. For example, entity A may be the initiator entity and initiator ULP 610 and initiator RT 630 may be communication protocol layers configured as upper-layer protocol 610 and reliable transport protocol layer 630 of FIG. 6, while entity B may be the target entity and target ULP 620 and target RT 640 may be communication protocol layers configured as upper-layer protocol 620 and reliable transport protocol layer 640 of FIG. 6.

Referring to the timing diagram 600, a number of requests may originate from the initiator entity A, including pull requests such as pullReq_1, shown as communication path 602, and push requests such as pushReq_0, pushReq_2, and pushReq_3, shown as communication paths 601, 603, 604. As described above, these requests may be sent by the initiator ULP 610 to the initiator RT 630. Once the initiator RT 630 receives these requests, initiator RT 630 may optionally determine whether the push requests should be sent as solicited or unsolicited. Thus, in this example, the initiator RT 630 may determine that pushReq_0 and pushReq_2 are to be sent as solicited, while pushReq_3 is to be sent as unsolicited. The initiator RT 630 may then send these pull and push requests to the target RT 640, for example over the connection 110.

The requests may be sent by the initiator ULP 610 in a particular order as indicated by the Request Sequence Numbers ("RSN"), which may be assigned by the initiator RT 630, so as to track the transaction orders. In some instances, the initiator RT 630 may also assign Solicited Sequence Numbers ("SSN") specifically to solicited push requests, which may be an incremental number as shown. When the requests are sent as packets between two entities, the requests may be assigned with a sequence of numbers in ascending order according to the order of the RSN. Thus, as shown, the requests may be assigned PSNs within one or more TX sliding windows maintained by initiator entity A according to the RSNs. For example, pushSlctdReq_0, shown as a communication path 611, is assigned PSN=0, pullReq_1, shown as a communication path 614, is assigned PSN=1, pushSlctdReq_2, shown as a communication path 612, is assigned PSN=2 within a request TX sliding window of entity A (indicated by dash lines pointing towards B). Note that since pushReq_3 from the initiator ULP 610 does not require solicitation, there is no corresponding pushUnslctdReq being sent between the RTs. While RSNs and SSNs may be known to the ULPs, the PSNs may be unknown to the ULPs but only used by the RTs in packets.

In response to the solicited push requests, push grants may be sent by the target RT 640 to the initiator RT 630 in the order of the received requests, such as pushGnt_0 and pushGnt_2, shown as communication paths 605, 606 respectively. The push grants may be assigned with PSNs in ascending order within one or more TX sliding windows maintained by the target entity B according to the same order as the RSNs of the push requests. For example, pushGrnt_0 is assigned PSN=1000 and pushGrnt_2 is assigned PSN=1001 within a data TX sliding window of entity B (indicated by dash-dot lines pointing towards A). However, the push grants may not be received in the same order by the initiator RT 630 as the order of transmission for the push requests. Thus, as shown, pushGrnt_2 is received by the initiator RT 630 before the pushGrnt_0. In this regard, the reorder engine 256, 296 may assist reassembling the order of the requests prior to sending to ULPs.

The initiator RT 630 may determine the correct order of the push grants based on their respective RSNs and push the data packets based on that order. Such order may be determined by performing a look-up operation in the reorder engine to determine the correct order. As such, although pushGrnt_2 was received by the initiator RT 630 before pushGrnt_0, the initiator RT 630 may first push the data solicited by pushGrnt_0 with pushSlctdData_0 and then push the data solicited by pushGrnt_2 with pushSlctdData_2 to target RT 640. The pushed data packets are also assigned PSNs in ascending order within one or more TX sliding windows maintained by initiator entity A according to the order of transmission. For example, pushSlctdData_0 is assigned PSN=200 and pushSlctdData_2 is assigned PSN=201 within a data TX sliding window of entity A (indicated by dash-dot lines pointing towards B shown as the communication paths 626, 625 respectively). Note that the pushReq_3 does not require a grant, thus as indicated by the curved arrow 655 skips directly to pushUnslctdData_3, shown as the communication path 613, which pushes the unsolicited data. In this example, pushUnslctdData_3 is assigned PSN=202 also in the data TX sliding window of entity A.

Target RT 640 receives the requests, and then sends corresponding requests to the target ULP 620 in the order of ULP-Req-0-1-2-3, which is in the same order as the transmission order of the requests from the initiator ULP 610 shown at the top of the timing diagram 800. These ULP-Reqs ask the target ULP 620 for permission to pull data, or to place the pushed data at the target entity B. Note that the pull request pullReq_1 does not require a grant as described, thus as indicated by the curved arrow 656 skips directly to the ULP-Req. In response to the ULP-Reqs, the target ULP 620 may send acknowledgment ULP-ACKs to the target RT 640. In this ordered system, the ULP-ACKs are sent in the order of ULP-ACK-0-1-2-3, which is the same as the order of transmission for the requests from the initiator ULP 610.

Following the ULP-ACKs, with respect to the push transactions, ACKs acknowledging the data packets (or data acknowledgments) are then sent by target RT 640 to initiator RT 630 to notify the safe receipt and placement of the reliable transport data packets. As an example, ACK-eBSN=3, 203, shown as the communication path 608, is sent by entity B to notify entity A that all request packets up to PSN=3 and all data packets up to PSN=203 have been received and placed. Once the ACK is received, initiator RT 630 may send a completion message pushCompl_0 to initiator ULP 610. Further, in some instances, acknowledgment packets may be opportunistically piggybacked on other reliable transport packets. For example, the requests pushSlctdReq_0, pullReq_1, and pushSlctdReq_2, are reliable transport packets requiring an ACK, but these acknowledgments to requests (or request ACKs) are not explicitly shown in timing diagram 800 because they may be piggybacked on reliable transport packets such as pushGrnt_0 and pushGrnt_2.

Also following the ULP-ACKs, pull requests may also be responded to. Thus, as shown, the target ULP 620 may send a pullResp_1 instructing target RT 640 to pull the requested data. Target RT 640 then sends the pulled data to the initiator RT 630 with pullData_1. In this example, pullData_1 is assigned PSN=1002 within the same data TX sliding window of entity B as the pushGrnts (indicated by dash-dot line pointing towards A). The initiator RT 630 then sends a pullResp_1, shown as the communication path 657, to the initiator ULP 610 so that the initiator ULP 610 may place or store the received data packet at entity A. After the data packet is placed or stored at entity A, an acknowledgment may be sent to notify entity B of safe receipt. Thus, as shown, ACK-1002-eBSN=0, 1003 is sent by entity A to notify entity B that the pullData_1 packet has been safely received.

In this ordered system, the completion messages received by the initiator ULP 610 near the bottom of timing diagram 600 are in the same order as the requests that were sent by initiator ULP 610 near the top of the timing diagram 600.

This order is maintained on ULPs of both initiator and target entities, where the target RT presents requests to the target ULP in the same order as the initiator ULP sends requests to the initiator RT. This ordered system ensures that the requests are delivered once and only once over the connection. In contrast, there may not be an ordering requirement between transactions going in different directions over the connection.

However, in some situations wherein the requests transmitted between the initiator RT and the target RT may be out of order due to different paths or other factors such as unexpected delay or equipment failure, the requests may arrive at the target RT out of sequence or out of order, or the request may be dropped or corrupted. This may become problematic when the target RT is configured to receive the requests in the same order as transmitted from the initiator RT.

Figure 7:
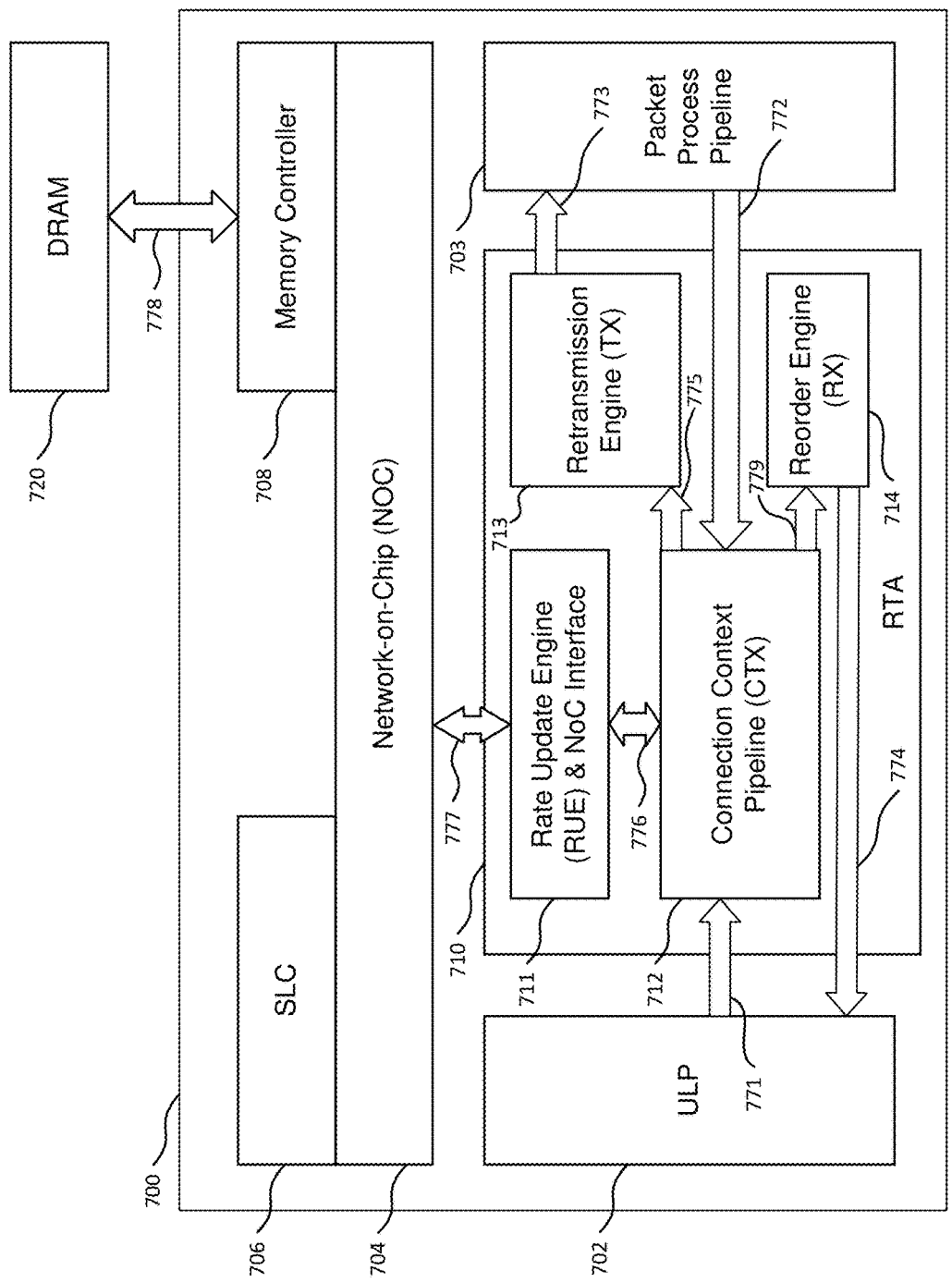
FIG. 7 is a block diagram of an example network interface card architecture according to aspects of the technology.

FIG. 7 depicts an ASIC 700, for use on a network interface card (not shown), with an integrated reliable transport accelerator (RTA) 710 configured to control data path operations and connection contexts. The RTA 710 interfaces with upstream Upper-Layer Protocol (ULP) 702 and downstream packet process pipeline 703 for managing or otherwise controlling data path operations. FIG. 7 illustrates the RTA 710, ULP 702, and packet process pipeline 703 as individual accelerators. However, in some instances the RTA 710, ULP 702, and/or packet process pipeline 703 may be any number accelerators.

The RTA further communicates with memory through a Network-on-Chip (NoC) 704 for managing connection contexts within on-chip or off-chip memory. In this regard, the network interface card supports external memory, referred to herein as off-chip memory 720. The network interface card also supports on-chip memory, referred to herein as system-level cache (SLC) 706. Both SLC 706 and off-chip memory 720 can be configured as user memory. In this regard, the RTA 710 may communicate with the SLC 706 through the NoC 704. Alternatively, or simultaneously, the RTA 710 may communicate with off-chip memory 720 through the NoC 704 and a memory controller 708.

As further illustrated in FIG. 7, off-chip memory 720 is memory that is positioned off of the ASIC 700, such as on the same network card (not shown) as the ASIC. Although off-chip memory 720 is illustrated as DRAM in FIG. 7, any type of memory may be used.

Depending on user configurations, RT connection contexts can be stored either in the SLC 706 as a cache entry or in off-chip memory 720. The memory subsystem on the ASIC 700 may implement a relaxed memory model which does not guarantee ordering of load/store to the same memory address. The memory subsystem may be an ARM memory subsystem. As previously explained, a "connection context" may include sliding windows for packet reliability, transaction ordering information, security protection, and congestion control.

The RTA 710 is partitioned into four main units including a Rate Update (RUE) & NoC Interface 711, Connection Context Pipeline (CTX) 712, Retransmission Engine (TX) 713, and Reorder Engine (RX) 714. Each of the units 711, 712, 713, and 714 may be accelerators comprised of one or more accelerators capable of providing the functionalities described herein. In some instances, the RTA 710 may be comprised of one accelerator capable of providing all of the functionalities of each of the four units, 711-714. The accelerator(s) may each be comprised of one or more processors capable of providing particular acceleration functionality.

The CTX 712 is configured to provide connection context cache management.

The CTX 712 may also implement packet admission controls based on connection receiving sliding window state and security configurations. As illustrated in FIG. 7, the CTX 712 may receive packets from the ULP directly, as illustrated by arrow 771. Similarly, the CTX 712 may receive packets from the network through the ingress packet process pipeline 703, as illustrated by arrow 772.

The retransmission engine (TX) 713 may receive packets from the CTX 712, as illustrated by arrow 775. The TX 713 may transmit the packets to the network through the egress packet process pipeline 703, based on a per-connection packet format configuration, as illustrated by arrow 773. The TX 713 may implement packet reliability and serve as the main retransmission data buffer.

The Reorder Engine (RX) 714 may utilize per connection ordering states to reorder transactions. In this regard, the RX 714 may send packet payload and transaction completion data to ULP 702, as illustrated by arrow 774. RX 714 may also serve as the main receiver data buffer from the CTX, as illustrated by arrow 779.

The Rate Update Engine (RUE) & NoC Interface 711 supports reliable transport congestion control (CC) and at the same time implements the NoC interfaces for the internal cache management pipeline in CTX 712, described herein.

Figure 8:
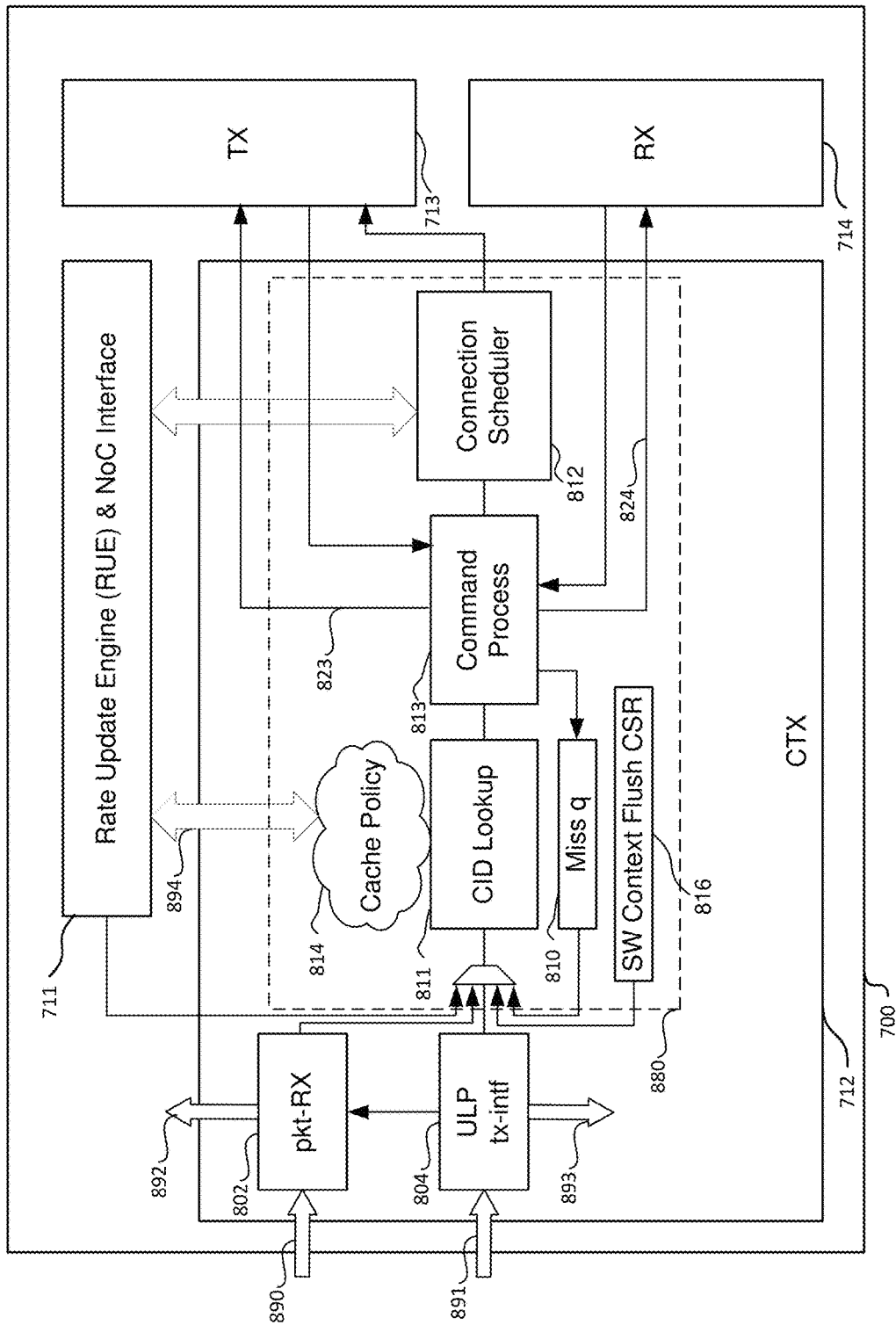
FIG. 8 is a block diagram of a connection context pipeline architecture according to aspects of the technology.

FIG. 8 illustrates a detailed illustration of the flow of data through the CTX 712. Packets, including variable packet data, illustrated as ULP tx-intf 804, may be received from ULP 702, as illustrated by arrow 891. Upon receipt, the CTX 712 may parse the variable packet data and extract a fixed format command through the internal cache pipeline, illustrated by dashed box 880. In this regard, any event, such as a packet received from the network, a transaction received from the ULP 702, or an internal cache management event may be formatted into a "command". Each packet received may be of a different type, for example, pull request packets, push data packets, etc. Each of these packets may be mapped/converted into a fixed format command for internal processing. Upon receipt of packet data, per connection pending transaction counters, within the CTX 712, may be immediately incremented for both cache entry management purposes and RT resource management purposes. The packet data associated with the command is directly sent to TX data buffers, as illustrated by line 893. The direct transmission of the command to the TX data buffers may eliminate the need for a large data buffer in the CTX pipeline 880.

As explained, RTA 710 implements a fully-associative cache for connection contexts. In this regard, the connection ID (CID) of the packets, may be used as a cache entry lookup key within a connection identifier lookup database, illustrated by CID Lookup 811, for existing connections in the cache, stored in the CID Lookup 811. In this regard, the RUE & NoC interface 711 may communicate with the NoC 704, as illustrated by arrow 777, which in turn may communicate with SLC 706.

In case of a cache miss, CTX 712 may allocate a free cache entry within the CID Lookup 811 to the connection and issue a memory read to attempt and fetch the connection, and the corresponding connection context data from off-chip memory 720 (or on-chip memory 706) through the NOC 704. In the case the connection context data is retrieved from off-chip memory, the memory controller 708 may communicate with the off-chip memory 720, as illustrated by arrow 778. The current command may be deposited, by the command process 813, into a per-connection cache miss queue 810. In the event connection context data is returned from the off-chip memory 720, the CTX 712 may install the connection context data into a cache entry within the on-chip cache of CID Lookup 811.

Command entries associated with the newly installed connection may become eligible for dequeue from the miss queue 810. In this regard, the command entries may go through the internal cache pipeline 880 for a second-pass process, as further illustrated in FIG. 8. During the second-pass, the command process 813 of CTX 712 may enqueue all ULP commands to the connection scheduler 812. The connection scheduler 812 may schedule transmission to the network based on per connection congestion control. The command process 813 of CTX 712 may also pass control information regarding the command to TX 713 as illustrated by arrow 823, and transaction completion information to RX 714, as illustrated by arrow 824.

In case of a cache hit for a particular CID associated with a connection, and when no pending commands associated with the same CID is within the miss queue 810, the command is processed immediately without going through the miss queue 810. For ordering purposes, some or all later ULP transactions associated with a CID may also go through the miss queue 813 if there are one or more commands in the miss queue 813 for the same CID.

The CTX 712 may similarly process packets received from the network, which are subjected to additional admission controls including per connection receiving sliding window and security checks, as described herein. In this regard, data associated with data packets, illustrated as pkt-RX 802, may be received from the network, as illustrated by arrow 890. The data associated with data packets 802 may be are stored directly in RX 714, as illustrated by arrow 892. Furthermore, packets received from the network 802 may trigger congestion control events to the RUE and NoC Interface, as illustrated by arrow 894. For packets received from the network, ordering may not be strictly required, hence they may bypass cache miss queue 810 as long as cache is hit during the CID lookup 811.

The cache policy 814, illustrated in FIG. 8, may choose and evict connection context entries from the cache, stored on CID Lookup 811, when cache occupancy goes above a configured threshold. The threshold may be preprogrammed or configured by a user or application. RT 714 may implement both random and serial eviction (e.g., first in, first out (FIFO)), based on the cache index.

Connection contexts may be eligible for eviction from the cache store in the SLC 706 when they become idle with pending transaction counts equal to 0. In this regard, TX 713 may decrement resource counters to CTX 712 when packets in the retransmission engine 713 are acknowledged by a remote node. The reorder engine 714 may decrement transaction counters to CTX 712 when a transaction has been completed to or acknowledged by local ULP. The transaction counters may be decremented by TX when a transmitted packet has been acknowledged and hence deleted from the retransmission buffer. In another example, the transaction counters may be decremented by RX when a transaction is completed to ULP and hence deleted from the reorder buffer.

As explained in the Cache Entry State Transitions Section, the CTX cache pipeline 880 may serialize access to the same CID to avoid read/write hazards in the relaxed memory model.

Since hardware (HW), such as the RTA 710, dynamically fetches and updates connection contexts on-chip at run-time, a mechanism for software (SW) to coherently and atomically update the connection contexts is required. RT may provide a SW context flush interface through Control/Status Register (CSR) 816, as further illustrated in FIG. 8. The SW may trigger one connection context update through the flush control CSR. HW may then write the content through to the main memory where all the connection contexts may be stored, including the off-chip memory 720 and on-chip memory (SLC 706). A user may define which main memory the connection contexts should be stored. HW may search the on-chip cache (CID Lookup 811), for the CID, and, if found, update content in the cache. SW polls the flush status CSR for HW completion status of previous flush operation and readiness for next operation.

Cache Entry State Transitions

Figure 9:
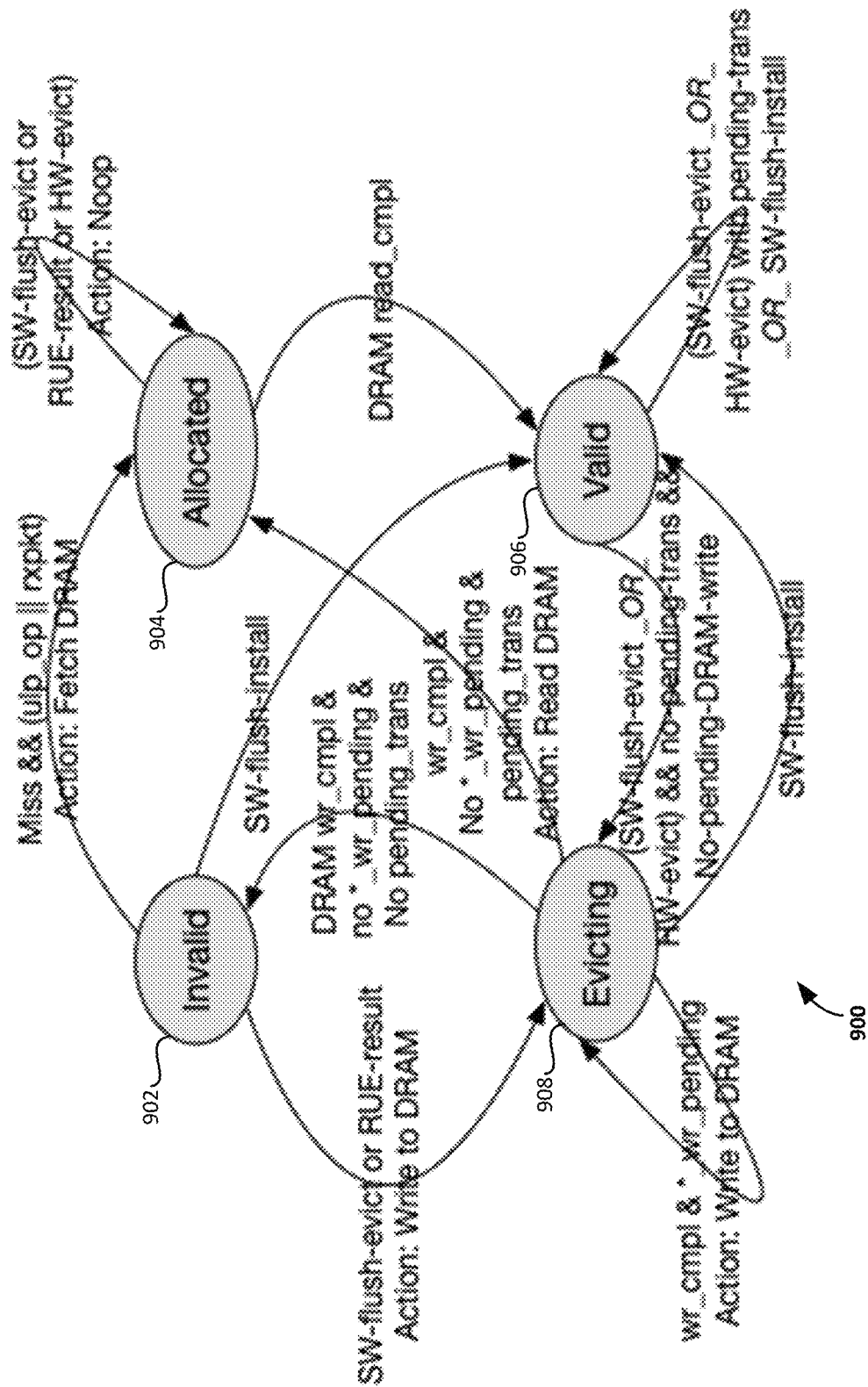
FIG. 9 is an example finite state machine illustrating the possible states for a cache entry and how transitions between states may occur, according to aspects of the technology.

FIG. 9 illustrates a cache entry finite state machine (FSM) 900. As shown, the FSM includes four states: Invalid 902, Allocated 904, Valid 906, and Evicting 908. Commands received from the network or ULP are processed as cache hit when the CID associated with the commands match a CID associated with cache entry, storing connection context data, in a Valid state 906.

Each cache entry may start as Invalid 902. When a command is received from either ULP or the network, HW may allocate a cache entry within the CID Lookup 811 for the connection context, as identified by the CID in the command. The HW (e.g., RTA 710) may also issue a memory read for the connection context. Upon completion of these steps, the cache entry for the connection context may transition into the Allocated state 904.

Memory access to a connection context in the Allocated state 904 may be blocked. By blocking access to connection contexts in the Allocated state 904, memory access hazards may be avoided. As a result, any SW flush or RUE result write is stalled in this state.

Return of the read data may cause the cache entry to transition from an Allocated state 904 to a Valid state 906 and any pending writes to the connection context in on-chip memory can then be processed serially. After all pending transactions are completed for the connection, CTX cache pipeline 880 may attempt an eviction of the cache entry by writing the content to off-chip memory 720 and transitioning the cache entry into the Evicting state 908. Similarly, all other access to the same connection context is stalled and serialized to prevent multiple outstanding read/write to the same memory address. If more ULP or network commands directed to a connection context in the Evicting state 908, the cache entry for the connection context in the Evicting state 908 may transition back to the Allocated state 904, so that the connection context data can be retrieved. Otherwise, when all write completions are returned from the off-chip memory 720, the cache entry transition to the Invalid state and the on-chip resources associated with that cache entry may be freed up.

When a SW flush or RUE result is received for a cache entry in the Invalid state, the cache entry may transition directly from Invalid state 902 into the Evicting state 908. Additionally, RTA 710 may support a mode where SW flush is able to install a valid cache entry directly even from an initial state of Invalid 902.

Cache Pipeline Hazard Avoidance

The cache CID lookup process is a multi-clock-cycle event, and the command processing itself takes multiple cycles. As such, multiple hazard conditions are presented during cache entry state transitions. For RTA 710, the lookup may involve two memory accesses and a total of 6-cycle latency. Additionally, command processing may take 2 cycles. HW hazard condition avoidance is handled in two separate stages. Firstly, the 6 cycle memory lookup pipeline implements bypass logic, such that all lookups always return the latest result after all prior modifications. This tight loop includes a non-existent cache entry (in Invalid state) transiting to Allocated or Evicting state that involves free entry allocation. Secondly, HW detects and stalls access to the same CID to be every other cycle since bypass does not address the 2-cycle cache entry state modification latency.

In one hazard condition, when cache entry transitions into Invalid state 602 and the cache entry is being deallocated, the HW may stall access to the same connection for 6 cycles after a memory-write completion is being processed, which is the only type of operation that might lead to entry deallocation. The performance impact of such stalling is negligible since memory-write completion is not a common case command.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An application specific integrated circuit (ASIC) of a network interface card, including:
    a reliable transport accelerator (RTA) including a cache lookup database, wherein the RTA is configured to:
        determine, from a received data packet, a connection identifier;
        query the cache lookup database for a cache entry corresponding to a connection context having the connection identifier; and
        receive, in response to the query, a cache hit or a cache miss, wherein:
        the network interface card includes off-chip memory storing one or more connection contexts associated with one or more connection identifiers,
        the off-chip memory is positioned on the network interface card and connected to the ASIC, and
        the RTA communicates with the off-chip memory via a network-on-chip (NOC).

2. The ASIC of claim 1, wherein the ASIC further includes on-chip memory storing one or more connection contexts associated with one or more connection identifiers.

3. The ASIC of claim 2, wherein a cache miss indicates that the connection context having the connection identifier is not stored in the cache lookup database.

4. The ASIC of claim 3, wherein, after receiving a cache miss, the RTA retrieves the connection context from the on-chip memory or the off-chip memory.

5. The ASIC of claim 4, wherein the RTA stores the connection context in the on-chip memory or the off-chip memory based on a predefined user configuration.

6. The ASIC of claim 1, wherein a cache hit indicates that the connection context having the connection identifier is stored in the cache lookup database.

7. The ASIC of claim 6, further including a cache policy stored by the cache lookup database, wherein the cache policy defines when one or more connection contexts are evicted from the cache lookup database.

8. The ASIC of claim 7, wherein evicted connection contexts are moved to on-chip or off-chip memory.

9. The ASIC of claim 1 further comprising an upper-layer protocol accelerator (ULP) and a packet process pipeline accelerator.

10. The ASIC of claim 1, wherein the RTA further includes a context flush interface, and the RTA is further configured to:
    dynamically fetch and update connection context at runtime; and
    update, using the context flush interface, the context connections stored in the cache lookup database.

11. The ASIC of claim 1, wherein:
    the RTA further includes a reliable transport protocol partitioned into at least two layers, and
    the at least two layers of protocols include a solicitation layer configured to end-point admission control and a sliding window layer configured for end-to-end reliable delivery and congestion control.

12. The ASIC of claim 1, wherein the RTA communicates with the off-chip memory for managing connection contexts with the off-chip memory.

13. A method for managing connection contexts, the method including:
    determining, by a reliable transport accelerator (RTA) including a cache lookup database, a connection identifier for a received data packet;
    querying, by the RTA, the cache lookup database for a cache entry corresponding to a connection context having the connection identifier; and
    receiving, from the cache lookup database, in response to the query, a cache hit or a cache miss,
    wherein:
        the RTA communicates with off-chip memory via a network-on-chip (NOC),
        the off-chip memory stores one or more connection contexts associated with one or more connection identifiers,
        the off-chip memory is positioned on a network interface card and connected to an application specific integrated circuit (ASIC) of the network interface card.

14. The method of claim 13, wherein a cache miss indicates that the connection context having the connection identifier is not stored in the cache lookup database.

15. The method of claim 14, wherein, after receiving a cache miss, the RTA retrieves the connection context from on-chip memory or off-chip memory.

16. The method of claim 15, wherein the RTA stores the connection context in the on-chip memory or the off-chip memory based on a predefined user configuration.

17. The method of claim 13, wherein a cache hit indicates that the connection context having the connection identifier is stored in the cache lookup database.

18. The method of claim 13, wherein the RTA further includes a cache policy stored by the cache lookup database, wherein the cache policy defines when one or more connection contexts are evicted from the cache lookup database.

19. The method of claim 18, wherein evicted connection contexts are moved to on-chip or off-chip memory.

20. The method of claim 19, wherein the on-chip memory is located on an ASIC with the RTA.

\* \* \* \* \*